US008120673B2

(12) United States Patent
Uwai et al.

(10) Patent No.: US 8,120,673 B2
(45) Date of Patent: Feb. 21, 2012

(54) CAMERA

(75) Inventors: Hiroki Uwai, Yokohama (JP); Keita Kimura, Tokyo (JP)

(73) Assignee: Nikon Corporation, Tokyo (JP)

( * ) Notice: Subject to any disclaimer, the term of this patent is extended or adjusted under 35 U.S.C. 154(b) by 802 days.

(21) Appl. No.: 12/073,870

(22) Filed: Mar. 11, 2008

(65) Prior Publication Data

US 2008/0225138 A1 Sep. 18, 2008

(30) Foreign Application Priority Data

Mar. 14, 2007 (JP) .................. 2007-065132

(51) Int. Cl.
*H04N 5/76* (2006.01)
*H04N 5/217* (2011.01)
(52) U.S. Cl. ..................... 348/231.3; 348/241
(58) Field of Classification Search .......... 348/241, 348/340, 231.3, 231.6
See application file for complete search history.

(56) References Cited

U.S. PATENT DOCUMENTS

| 6,791,608 | B1 | 9/2004 | Miyazawa |
| 6,940,550 | B2 | 9/2005 | Kitawaki et al. |
| 7,548,267 | B2 | 6/2009 | Kosugiyama |
| 7,580,071 | B2 | 8/2009 | Uchiyama |
| 7,705,906 | B2 | 4/2010 | Watanabe |
| 2006/0062568 | A1 | 3/2006 | Kawai |
| 2006/0279638 | A1 | 12/2006 | Matsuda et al. |
| 2007/0171294 | A1* | 7/2007 | Watanabe ............ 348/340 |

FOREIGN PATENT DOCUMENTS

| EP | 1 811 768 A1 | 7/2007 |
| JP | A 2000-312314 | 11/2000 |
| JP | A-2002-209147 | 7/2002 |
| JP | A-2003-018440 | 1/2003 |
| JP | A-2004-200818 | 7/2004 |
| JP | A-2005-072629 | 3/2005 |
| JP | A-2005-311695 | 11/2005 |
| JP | A-2006-010725 | 1/2006 |
| JP | A-2007-201637 | 8/2007 |
| JP | A-2007-336433 | 12/2007 |

OTHER PUBLICATIONS

Apr. 27, 2011 European Search Report issued in European Patent Application No. 08152567.7.
Sep. 13, 2011 Office Action in Japanese Patent Application No. 2007-065132 (with English translation).

* cited by examiner

*Primary Examiner* — Timothy J Henn
(74) *Attorney, Agent, or Firm* — Oliff & Berridge, PLC

(57) ABSTRACT

A camera includes: an image obtaining unit that obtains an object image obtained by capturing an image of an object and a dust reference image obtained by capturing an image of dust that adheres on an image sensor or a protecting member protecting the image sensor; a recording unit that records the object image and data concerning the dust reference image in correlation to each other; a dust removing unit that physically removes the dust adhering on the image sensor or the protecting member. The recording unit is configured such that when the dust is removed by the dust removing unit, the recording unit stops correlating the object image captured after the removal to the data concerning the dust reference image already captured.

11 Claims, 2 Drawing Sheets

CAMERA

INCORPORATION BY REFERENCE

The disclosure of the following priority application(s) is/are herein incorporated by reference:
Japanese Patent Application No. 2007-065132 (filed Mar. 14, 2007).

BACKGROUND OF THE INVENTION

1. Field of the Invention

The present invention relates to a camera that captures and obtains an image of a photographic object.

2. Description of Related Art

A digital camera of the following type is known. The digital camera stores a position of dust adhering to a CCD in advance, and when obtaining an image, the camera removes dust from the image by image processing based on the position of the dust that has been stored (for instance, see Japanese Laid-open Patent Application No. 2000-312314).

SUMMARY OF THE INVENTION

Besides digital cameras that adopt the method of removing dust from the image by image processing, there have been conventionally known digital cameras that adopt a method of vibrating an image sensor and physically removing the dust that adheres to the image sensor. In either one of the methods, the dust could not be removed completely as the case may be, and it is difficult to judge which one of the methods the camera manufacturers will adopt for their camera.

In the camera of the present invention, an object image obtained by capturing an image of an object and a dust reference image obtained by capturing an image of dust that adheres on an image sensor or a protecting member protecting the image sensor (hereafter, referred to as "dust reference image") are obtained. The object image and data concerning the dust reference image are recorded in correlation to each other. The dust adhering on the image sensor or the protecting member is physically removed. When the dust is removed, the recording unit stops correlating the object image captured after the removal to the data concerning the dust reference image already captured.

It is preferred that when the correlating the object image to the data concerning the dust reference image is stopped, a user is informed of the stop of the correlating.

When the dust is physically removed, a photographing condition under which photographing is performed by the image capturing unit may be set at a condition under which the dust reference image is to be obtained (dust reference image obtaining condition) and a new dust reference image may be obtained again under the set condition. Alternatively, a user may be reminded of obtaining again a new dust reference image. When the new dust reference image is obtained, it is preferred to restart correlation between data concerning the new dust reference image and the object image obtained thereafter.

During a period from the stop of the correlation to the restart of the correlation, data concerning a date of dust removal that specifies a day on which the dust removing unit physically removed the dust (dust removal day) in place of the data concerning the dust reference image may be recorded in correlation to the object image. When the new dust reference image is obtained, the data concerning the dust removal day may be recorded in correlation to the new dust reference image.

When a new dust reference image is obtained, data concerning the new dust reference image may be correlated to an object image or images obtained during the period from the stop of the correlation to the restart of the correlation (target object image). On this occasion, the data concerning the new dust reference image may be recorded in correlation to the target object image only when the dust removal day correlated to the target object image is the same as the dust removal day correlated to the new dust reference image. On the other hand, data that indicates absence of the data concerning the new dust reference image may be recorded in correlation to the target object image when the dust removal day correlated to the target object image is different from the dust removal day correlated to the new dust reference image.

It is preferred that the dust adhering to the image sensor or the protecting member is physically removed by vibrating the image sensor or the protecting member. Image processing to remove the image of the dust from the object image may be executed by the camera using the data concerning the dust reference image recorded in correlation to the object image.

In the camera according to another aspect of the present invention, an object image is obtained by capturing an image of an object formed on an image sensor, dust adhering on the image sensor or a protecting member that protects the image sensor is physically removed, and a position of an image of the dust in the object image is specified in a plurality of object images obtained by the image obtaining unit within a predetermined time after the dust is physically removed by the dust removing unit. An image of the dust present at the specified position is removed by image processing from the object image from the plurality of object images.

Further, it is preferred that next physical removal of the dust is executed after a predetermined time has elapsed from previous physical removal of the dust or a predetermined number of frames of the object image is captured.

DESCRIPTION OF PREFERRED EMBODIMENTS

Figure 1:
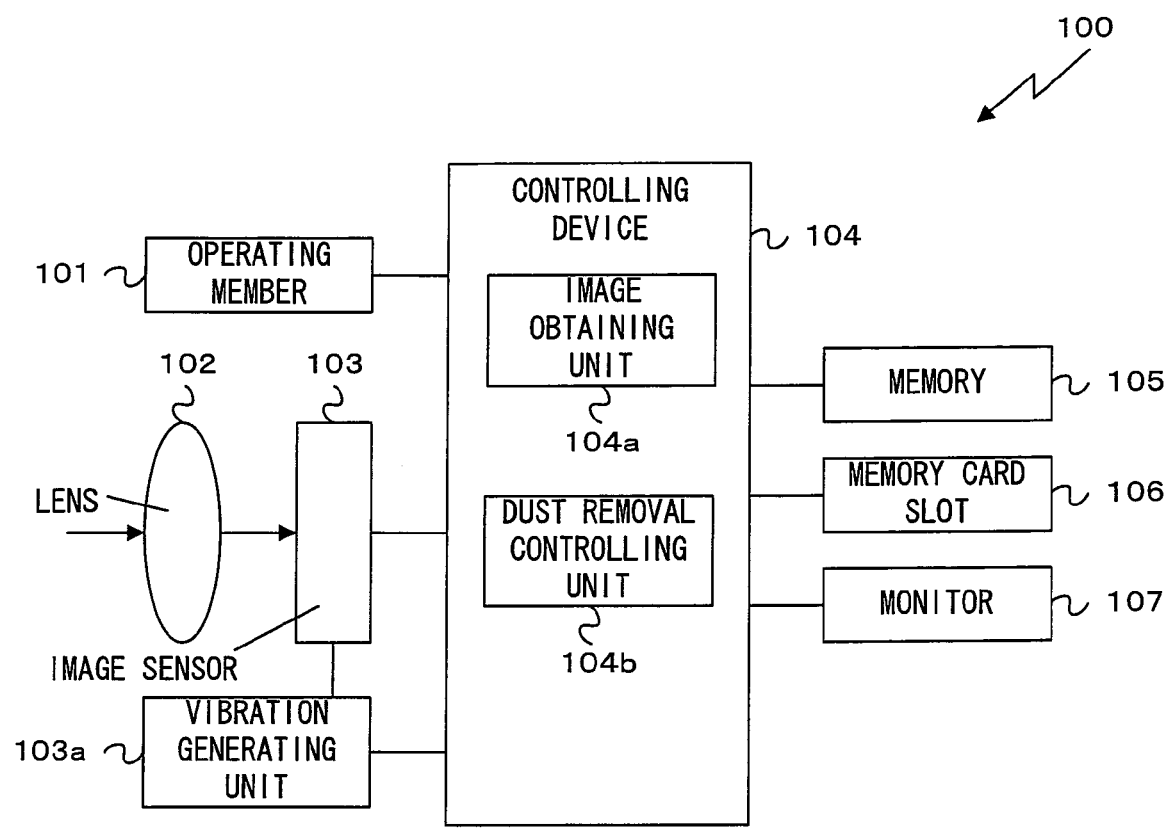
FIG. 1 is a block diagram showing a construction of a camera according to one embodiment.

FIG. 1 is a block diagram showing a construction of a camera according to an embodiment of the present invention. A camera 100 includes an operation member 101, a lens 102, an image sensor 103, a vibration generating unit 103a, a controlling device 104, a memory 105, a memory card slot 106, and a monitor 107. The operation member 101 includes various types of operation members for inputting, for instance, a power supply button, a release switch button, a zoom button, a multi-selector, a decision button, a reproduction button, and a deletion button, etc. operated by a user.

Although the lens 102 includes a plurality of optical lenses, it is represented by only one lens and others are omitted in FIG. 1. The image sensor 103 includes, for example, a CCD or a CMOS and captures an image formed by the lens 102. An image is obtained by outputting the captured image to the controlling device 104. The camera 100 according to this embodiment has a function of physically removing dust that adheres to the image sensor by vibrating the image sensor 103.

In order to achieve this, the camera 100 includes the vibration generating unit 103a that vibrates the image sensor 103. The controlling device 104 to be detailed later vibrates the image sensor 103 by controlling the vibration generating unit 103a to shake off the dust that adheres on the image formation plane of the image sensor 103 when the execution of a physical dust removal processing to be detailed later is directed by the user or a predetermined time set in advance passes from a last physical dust removal processing.

The camera 100 of this embodiment also has a function of removing the image of the dust that adheres to the image sensor 103 from the image by image processing as detailed later on. The camera 100 has a function of removing the image of the dust with high accuracy by using the function of removing the image of the dust by image processing and the function of removing dust by vibrating the image sensor 103 together.

The memory 105 includes, for instance, a flash memory, which is used as a buffer memory to temporarily record the image data obtained from the image captured by the image sensor 103 or the image data read through the memory card slot 106 as detailed later on. Various programs that enable the camera 100 to be operated are recorded therein. The memory card slot 106 is a slot for inserting therein a memory card as a recording medium that records image data and enables writing the data in the memory card and reading the data from the memory card.

The monitor 107 includes a liquid crystal monitor installed in the back of the camera 100. The controlling device 104 to be detailed later outputs the image obtained from the image captured by the image sensor 103 and the image read from the memory card to the monitor 107 and causes the image to be displayed thereon. The monitor 107 displays thereon a setting menu and so on of the camera 100.

The controlling device 104 is constituted by a CPU, the memory, and other peripheral circuitry, and includes the image obtaining unit 104a and the dust removal controlling unit 104b as logical function blocks. The controlling device 104 reads programs from the memory 105 and executes them to operate processings by each of the image obtaining unit 104a and the dust removal controlling unit 104b. Hereafter, the processing by each of the image obtaining unit 104a and the dust removal controlling unit 104b is described.

When a release switch button included in the operation member 101 is operated by the user, the image obtaining unit 104a obtains an image from the image captured by the image sensor 103. The image obtained by the image obtaining unit 104a includes a reference image to be referenced when a dust removal processing is performed by image processing (hereafter, referred to as a "dust reference image") to be detailed later and an object image obtained by capturing an image of an object. The camera 100 in this embodiment operates in two types of shooting modes, i.e., a dust reference image shooting mode for obtaining a dust reference image and a normal shooting mode for obtaining an image of the object. The user may set the camera to either one of the modes in advance by operating the operation member 101.

That is, the image obtaining unit 104a obtains an object image when the release switch button is pressed in the state where the camera is set to a usual shooting mode by the user. On the other hand, when the release switch button is pressed in the case where the camera is set to the dust reference image shooting mode, the dust reference image is obtained. As the dust reference image, there are used, for instance, an image obtained by capturing an image of a uniform surface such as white paper or a wall or an image of out of focus obtained by capturing an image of an object that exists at point-blank range with the focus suitable for infinity. The timing of obtaining the dust reference image is controlled by the dust removal controlling unit 104b.

The image obtaining unit 104a outputs data of the obtained object image or data of the dust reference image and records the output data in the memory 105. The object image or the dust reference image recorded in the memory 105 is compressed into an image data of a predetermined image format, for instance, a JPEG format. An image file is generated on the basis of the image data after the compression, and the image file is output to the memory card slot 106 or to the memory 105 again. For instance, the image obtaining unit 104a generates an image file of an Exif format that contains an image data field in which the data of the object image or the data of the dust reference image is recorded and an additional information field in which various data such as shooting conditions are recorded. Then, the image obtaining unit 104a is controlled to output an image file of the object image (hereafter, referred to as "object image file") to the memory card slot 106 and record it in the memory card. Also, the image obtaining unit 104a is controlled to record an image file of the dust reference image (hereafter, referred to as "dust reference image file") in the memory 105.

The dust removal controlling unit 104b records data concerning valid dust reference image (hereafter, referred to as "dust reference data"), which has been recorded in the memory 105 at a point in time in which the object image was obtained, in the additional information field of the object image file generated by the image obtaining unit 104a. As a result, the subject image and the dust reference data can be recorded in correlation therebetween. Here, that the dust reference image data is valid means that it is different from the dust reference image data to be invalidated by a processing to be detailed later. The dust reference data may be image data itself of the dust reference image or a file name of the dust reference image. Moreover, as will be detailed later, information on the position of the dust specified by the dust removal controlling unit 104b on the basis of the dust reference image may be recorded.

The dust removal controlling unit 104b executes the above-mentioned processing to vibrate the vibration generating unit 103a and physically remove the dust on the image-capturing plane of the image sensor 103 (hereafter, referred to as "physical dust removal processing"). Moreover, the dust removal controlling unit 104b executes a processing of specifying the position of the image of the dust that appears in the object image obtained by the image obtaining unit 104a on the basis of the dust reference image mentioned above and removing the image of the dust by image processing (hereafter, referred to as "dust removal processing by image processing").

The dust removal processing by image processing is described. The dust removal controlling unit 104b, as mentioned above, analyzes the dust reference data recorded in the additional information field of the object image file to specify the position of the image of the dust in the dust reference image. That is, which pixel in the dust reference image the position of the image of the dust that adheres on the image-capturing plane of image sensor 103 comes under is specified, for instance, with coordinate values.

Then, the dust removal controlling unit 104b removes the image of the dust at the position specified on the basis of the dust reference image from the object image by image processing. For instance, the image of the dust that appears in the object image is removed by interpolating the pixel that comes under the position of the image of the dust specified on the basis of the dust reference image by using pixel values of surrounding pixels.

In the camera 100 according to this embodiment, the image sensor 103 is vibrated by the above-mentioned processing, so that the dust on the image-capturing plane can be physically removed. In addition, even when the image of the dust that can not be completely removed by merely vibrating the image sensor 103 appears in the object image, the image of the dust can be removed from the object image by image processing.

The dust removal controlling unit 104b may be constructed such that when the execution of the dust removal processing by image processing is directed by the user, the dust removal controlling unit 104b controls the units to perform the dust removal processing by image processing for the object image that has already been obtained by the image obtaining unit 104a. Alternatively, the dust removal processing by image processing may be executed for respective object images every time the object image is obtained by the image obtaining unit 104a. In this embodiment, explanation is made on the case where the dust removal processing is executed when the execution of the dust removal processing by image processing is directed by the user.

When the object image is obtained by the image obtaining unit 104a, the dust removal controlling unit 104b records the dust reference data mentioned above to the additional information field of the object image file. At the same time, an indicator flag of pending processing in the additional information field is set ON. That indicator flag of pending processing is set ON means that the dust removal execution processing to the object image file has not been executed yet. When the execution of the dust removal processing by image processing is directed by the user, the dust removal controlling unit 104b controls the units to extract and read only those image files to which the indicator flag of pending processing in the additional information field is set ON from among the image files recorded in the memory card, and executes the dust removal processing by image processing as mentioned above. In the image file of which the dust removal processing is completed, the indicator flag of pending processing in the additional information field is set OFF or the indicator flag of pending processing is deleted.

When the physical dust removal processing and the dust removal processing by image processing are used in combination as in the camera 100 according to this embodiment, it becomes impossible after the physical dust removal processing to use the dust reference image that has been obtained before the physical dust removal processing. This is because the situation of adhesion of the dust to the image sensor 103 changes before and after the physical dust removal processing as the dust that adheres to the image sensor 103 comes to be shaken off by the physical dust removal processing, or the position of the dust changes. Therefore, if the dust removal processing by image processing that uses the dust reference image obtained before the dust removal processing is executed after the physical processing of the dust removal, the image of the dust can not be removed from the object image accurately.

In order to solve such a problem, the dust removal controlling unit 104b according to this embodiment processes as follows. When the physical dust removal processing is directed and the image sensor 103 is vibrated, the dust removal controlling unit 104b controls the units to record data on time and date of the vibration in the memory 105. In addition, the dust removal controlling unit 104b invalidates an existing dust reference image data and displays a notice on the monitor 107 to inform the user that the existing dust reference image became invalid.

In this embodiment, when the dust removal controlling unit 104b stops correlation between the object image and the dust reference data, it is deemed that execution of the dust reference image data invalidation processing is completed. To stop the correlation is to stop recording the dust reference data in the additional information field of the image file. Or, the deletion of the dust reference image data from the memory 105 may be deemed to be completion of execution of the invalidation processing.

Instead of recording the dust reference data for the object image obtained after the dust reference image data is invalidated in the additional information field of the image file as mentioned above, the dust removal controlling unit 104b controls the units to record data concerning the time and date of vibration of the image sensor 103 recorded in the memory 105 (hereafter, referred to "data concerning a dust removal day") in the additional information field of the image file. The recording of the data concerning the dust removal day in the additional information field is executed until a new dust reference image is obtained according to the instruction from the user.

When the user has checked the displayed contents of the monitor 107 to confirm that the dust reference image data became invalid, the user sets the camera in the dust reference image shooting mode mentioned above, and takes an image of the uniform surface or an image out of focus to obtain a new dust reference image. When a new dust reference image is shot by the user, the image obtaining unit 104a generates the dust reference image file mentioned above and records it in the memory 105. On this occasion, the dust removal controlling unit 104b records the data concerning the dust removal day recorded in the memory 105 in the additional information field of the dust reference image file newly generated. That is, the data concerning the day when the dust was physically removed (hereafter, referred to as "dust removal day") is recorded in correlation to the new dust reference image.

The dust removal controlling unit 104b calculates a dust reference data based on a new dust reference image, and restarts the correlation of the object image newly obtained thereafter to the dust reference data. In addition, the dust removal controlling unit 104b confirms whether or not there is an image file in which no dust reference data is recorded in the additional information field in the memory card. When there is an image file in which no dust reference data is recorded in the additional information field, the data concerning the dust removal day recorded in the additional information field of the image file and the data concerning the dust removal day recorded in the additional information field of the new dust reference image file are compared with each other and it is judged whether the both agree to each other.

When the both data agree to each other, the dust removal controlling unit 104b judges that the newly obtained dust reference image can be used in specifying the position of dust on the image-capturing plane of the image sensor 103 at the time when the object image is newly obtained. Then, the dust removal controlling unit 104b records the dust reference data based on the dust reference image newly obtained in the additional information field of the object image file newly obtained.

When the both data do not agree to each other, the dust removal controlling unit 104b judges that the newly obtained dust reference image can not be used in specifying the position of dust on the image-capturing plane of the image sensor 103 at the time when the object image was newly obtained. Then, the dust removal controlling unit 104b records a data indicating that there is no dust reference image, for instance, ON-setting of a flag that shows absence of dust reference images in the additional information field of the object image file newly obtained. When the dust removal processing by image processing mentioned above is executed, the dust removal controlling unit 104b excludes the image file in which the flag that shows absence of the dust reference images is recorded in the additional information field from the target of the dust removal processing.

By the processing mentioned above, the dust reference data based on a new dust reference image can be recorded all together in the additional information field of each of the object image files obtained during the period from the invalidation of the dust reference image data to the obtention of the new dust reference image. On this occasion, the dust reference data is recorded in the additional information field of each of the subject image files only when it is judged that the data concerning the dust removal day recorded in the additional information field of the object image file and the data concerning the dust removal day recorded in the additional information field of the new dust reference image file agree to each other. Therefore, among dust reference data, only the dust reference data that can specify the position of the dust that adheres on the image-capturing plane of the image sensor 103 can be recorded in correlation to the object image.

Figure 2:
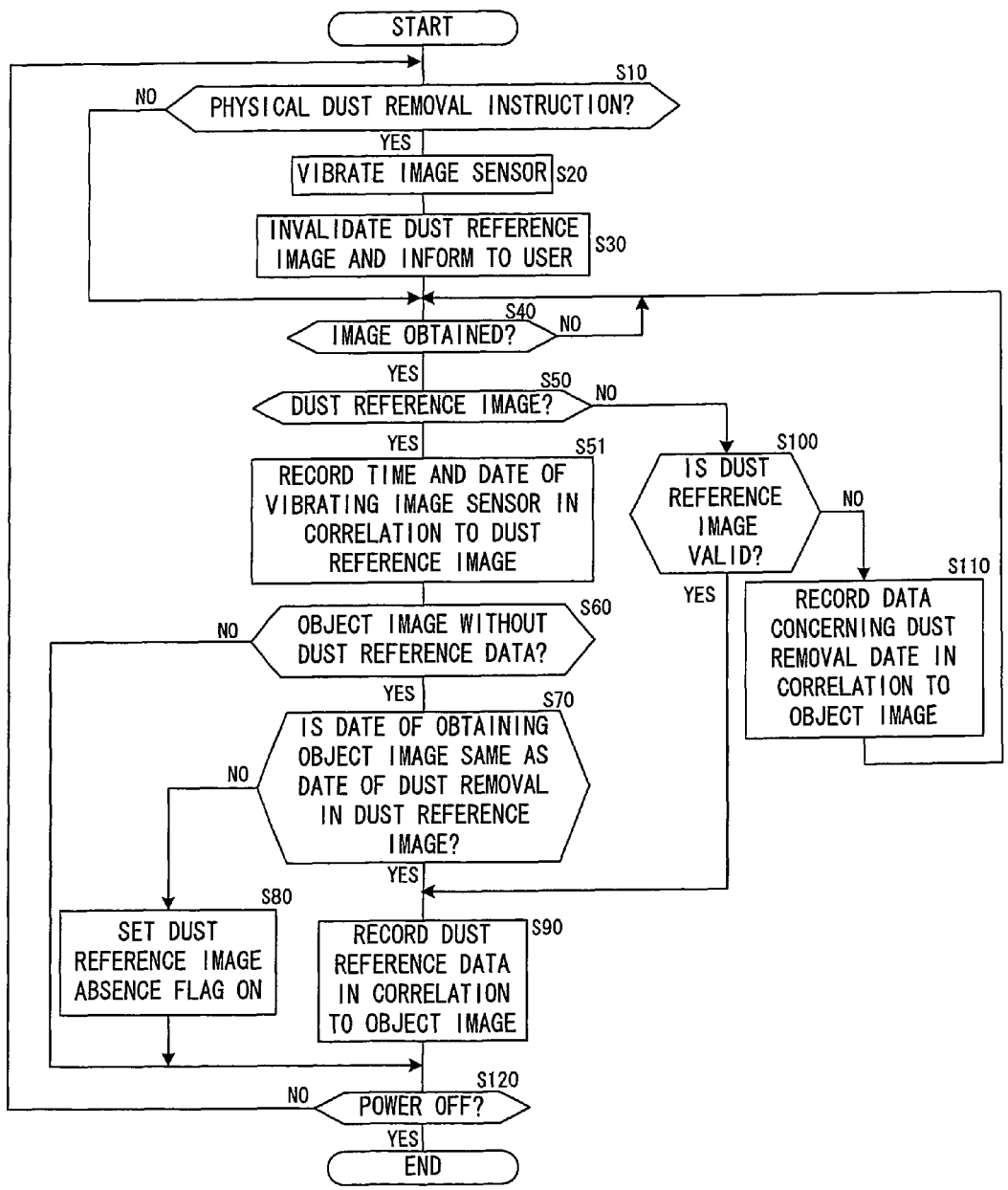
FIG. 2 is a flowchart illustrating processing by camera 100.

FIG. 2 is a flow chart that illustrates the processing executed with camera 100 in this embodiment. The processing illustrated in FIG. 2 is executed by the dust removal controlling unit 104b according to a program that is started up when the power supply of the camera 100 is turned ON by the user.

In a step S10, the dust removal controlling unit 104b judges whether an instruction on the execution of physical dust removal processing is received from the user. The processing proceeds to a step S40 to be detailed later for a negative judgment. The processing proceeds to a step S20 for an affirmative judgment, and the dust removal controlling unit 104b controls the vibration generating unit 103a to vibrate the image sensor 103. The dust that adheres on the image-capturing plane of the image sensor 103 is physically removed by the vibration of the image sensor 103. Thereafter, the processing proceeds to a step S30.

In the step S30, the dust removal controlling unit 104b invalidates the existing dust reference image data as mentioned above, informs the user of the invalidation, and advances the processing to the step S40. In the step S40, the dust removal controlling unit 104b judges whether the image obtaining unit 104a has obtained an image in response to pressing of the release switch button by the user. The processing proceeds to a step S50 for the affirmative judgment, and the dust removal controlling unit 104b judges whether the obtained image is an object image or a dust reference image on the basis of the shooting mode set when the image has been obtained.

When it is judged that the obtained image is a dust reference image, the processing is advanced to a step S51 and the dust removal controlling unit 104b records data concerning a latest date of vibrating the image sensor 103, that is, a latest dust removal day in the additional information field of the dust reference image file newly obtained. Thereafter, the processing proceeds to a step S60, and the dust removal controlling unit 104b judges whether there is any image file in which no dust reference data is recorded in the additional information field among the image files recorded in the memory card. The processing is advanced to a step S120 to be detailed later for a negative judgment. The processing is advanced to a step S70 for an affirmative judgment.

In the step S70, the dust removal controlling unit 104b compares the data concerning the dust removal day recorded in the additional information field of the object image file and the data concerning the dust removal day recorded in the additional information field of the new dust reference image file with each other, and judges whether the both dust removal days are the same day. The processing proceeds to the step S80 for a negative judgment, and the dust removal controlling unit 104b records ON-setting of a flag that shows absence of dust reference images in the additional information field of the object image file, and advances the processing to the step S120 to be detailed later.

The processing is advanced to a step S90 for the affirmative judgment. In the step S90, the dust removal controlling unit 104b records the dust reference data based on the obtained dust reference image in the additional information field of the object image file, and advances the processing to a step S120 to be detailed later. In the step S120, the dust removal controlling unit 104b judges whether or not the controlling device 104 detected that the power supply to the camera 100 has been turned off by the user. The processing is returned to the step S10 for a negative judgment and the processing mentioned above is repeated. On the other hand, the processing is ended for an affirmative judgment.

In the step S50, when the dust removal controlling unit 104b judges that the image obtained is an object image, the processing proceeds to the step S100, and the dust removal controlling unit 104b judges whether or not the dust reference image data is valid. The processing proceeds to the step S90 mentioned above for an affirmative judgment. The processing proceeds to a step S110 for a negative judgment. In the step S110, the dust removal controlling unit 104b records the data concerning the dust removal day recorded in the memory 105 in the additional information field of the object image file, and returns the processing to the step S40.

By the above-mentioned processing, the dust removal controlling unit 104b can record the obtained object image in correlation to the dust reference data. When the execution of the dust removal processing by image processing is directed by the user, the dust removal controlling unit 104b executes the image processing by reading the dust reference data from the additional information field of the object image file, specifying the position of the dust in the image, and removing the image of the dust that exists at the position as mentioned above.

The following operational advantages are obtained according to this embodiment described above.

(1) In case of physical removal of the dust that adheres to the image sensor 103, the correlation between the object image taken after the removal processing and the data concerning the dust reference image that has already been taken is stopped. That is, the dust removal controlling unit 104b is configured so as to invalidate the dust reference image data. This is because when the image sensor 103 is vibrated, the adhesion situation of the dust changes, so that the image processing using the dust reference image that has been obtained before the vibration does not results in accurate dust removal processing. This can prevent an inaccurate dust removal processing.

(2) The dust removal controlling unit 104b is configured such that when the dust reference image data has been invalidated, the dust removal controlling unit 104b informs the user of this to be the case. As a result, the user can understand that the existing dust reference image data became invalid, and that it is necessary to obtain a new dust reference image.

(3) The dust removal controlling unit 104b is configured such that when a new dust reference image is obtained, the dust removal controlling unit 104b restarts the correlation between data concerning the new dust reference image and object images obtained thereafter. As a result, when the dust removal processing by image processing is executed for the object image obtained after the new dust reference image is obtained, the new dust reference image can be used, so that the correlation can be automatically restarted at once.

(4) The dust removal controlling unit 104b is configured such that during the period from the invalidation of the dust reference image data to the obtention of a new dust reference image, the dust removal controlling unit 104b records data concerning the dust removal day to specify the day when the dust was physically removed in place of the data concerning the dust reference image in correlation to the object image. As a result, at a time when a new dust reference image is obtained, the correlation between data concerning the new dust reference image and the object image can be restarted at once.

(5) The dust removal controlling unit 104b is configured to record the data concerning the dust removal day also in correlation to the dust reference image file. As a result, it is also possible for another information device, for instance, a personal computer to read dust reference image data and to record therein data concerning the dust reference image in correlation to the object image.

(6) The dust removal controlling unit 104b is configured such that when a new dust reference image is obtained, the dust removal controlling unit 104b records data concerning the new dust reference image in correlation to the object image obtained during a period from the invalidation of the dust reference image data to the obtention of the new dust reference image. As a result, the dust reference image can be recorded also in correlation to the object image file obtained while the dust reference image data is invalid just after the dust reference image is obtained.

(7) The dust removal controlling unit 104b is configured such that only when data concerning the day when dust was physically removed correlated to an object image obtained while the dust reference image data is invalid is the same as data concerning the day when dust was physically removed correlated to a new dust reference image, the dust removal controlling unit 104b records the data concerning the dust reference image in correlation to the object image. This makes it possible to prevent data concerning a dust reference image obtained before the day when the dust has physically been removed from being correlated to the object image, despite the possibility that the adhesion situation of the dust shall change before and after the physical removal processing.

(8) When data concerning the day when the dust has physically been removed correlated to the object image obtained while the dust reference image data has been invalid is different from data concerning the day when the dust had been removed correlated to a new dust reference image, the dust removal controlling unit 104b records data indicating that there is no data concerning a dust reference image concerned, for instance, a flag indicating absence of dust reference images in correlation to the image file of the object image. As a result, the user can understand that there have been no data concerning the dust reference image that could be correlated to the object image in the object image.

(9) The dust removal control unit 104b is configured to remove the image of the dust from the object image by image processing that uses data concerning the dust reference image recorded in correlation to the object image. As a result, if a physical dust removal processing is used together with the dust removal processing by image processing, a dust removal processing with high accuracy is achieved.

—Modification—

The camera of the embodiment mentioned above can be modified as follows.

(1) In the embodiment mentioned above, explanation has been made on the example in which the dust removal controlling unit 104b controls the vibration generating unit 103a so as to vibrate the image sensor 103 to remove the dust adhering on the image-capturing plane. When the image sensor 103 is protected by the protecting member such as guard glass, dust does not adhere to the image sensor 103. However, the dust will adhere to the protecting member. In such a case, the dust removal controlling unit 104b may be configured to control the vibration generating unit 103a to vibrate the protecting member so that the dust adhering to the protecting member can be removed. Moreover, when the camera 100 includes a mirror that leads light incident through the lens 102 to a viewfinder (not shown), the dust removal controlling unit 104b may be configured so as to control the units to fan the mirror to generate a wind and physically remove the dust adhering on the image-capturing plane or on the protecting member of the image sensor 103 by the pressure of wind.

(2) In the embodiment described above, explanation has been made on the example in which the dust reference image data is invalidated because the adhesion situation of the dust on the image-capturing plane of the image sensor 103 changes when a physical dust removal processing is executed. However, the adhesion situation of the dust on the image-capturing plane of the image sensor 103 changes when the image sensor 103 is moved in order to correct blur when the camera 100 is provided with a mechanism that corrects the blur by moving the image sensor 103 in an orthogonal direction to an optical axis of the image sensor 103. Therefore, when the image sensor 103 vibrates for the blur correction, the dust removal controlling unit 104b only has to invalidate the dust reference image data and execute processing similar to that in the embodiment mentioned above.

(3) In the embodiment mentioned above, explanation has been made on the example of a physical dust removal processing in response to an instruction by the user. However, the dust removal controlling unit 104b may be configured to control the units to cause the physical dust removal processing to be executed automatically. For instance, the dust removal controlling unit 104b may be configured to control the units to execute the physical dust removal processing automatically when a predetermined time has elapsed from the last physical dust removal processing. Moreover, the dust removal controlling unit 104b may be configured to control the units to obtain a dust reference image periodically to monitor the dust adhesion situation and execute the dust removal processing automatically under a specific condition. By the term "under a specific condition" is meant a case where the number of pixels that correspond to positions at which dust adheres on the image-capturing plane of the image sensor 103 in a dust reference image exceeds a predetermined value. The camera 100 may be configured such that whether to execute a physical dust removal processing automatically or in response to the instruction from the user is set by the user on a menu screen displayed on the monitor 107 of the camera 100.

(4) In the embodiment mentioned above, explanation has been made on the example in which a new dust reference image is obtained in response to the instruction to obtain a dust reference image from the user after a physical dust removal processing. However, the dust removal controlling unit 104b may be configured to control the units to obtain the dust reference image automatically after a physical dust removal processing. Moreover, the dust removal controlling unit 104b may be configured to control the units to display a message to invite the user to give an instruction to obtain the dust reference image on the monitor 107 after a physical dust removal processing. This makes it possible to obtain the dust reference image without fail.

The dust reference image should be, for example, an image obtained by capturing an image of a uniform surface or a blurred image as mentioned above. Therefore, after a physical dust removal processing, it is necessary to meet a condition to automatically obtain a dust reference image (hereafter, referred to "dust reference image obtaining condition") in taking conditions automatically. For instance, the camera 100 is provided with an internal light source and the dust removal controlling unit 104b controls the units to lower a gray screen in front of the image sensor 103 after a physical dust removal processing. In addition, the dust reference image obtaining condition is met when light is irradiated to the gray screen by the internal light source. An image that the image obtaining unit 104a obtains under the conditions is a dust reference image.

(5) In the embodiment mentioned above, explanation has been made on the example in which the dust removal controlling unit 104b controls the units to execute the dust removal processing by image processing by specifying the position of the image of the dust that has appeared in the object image by use of the dust reference image. However, the positions of the dust images that appear in the respective object images may be specified based on a plurality of object images without using dust reference images. The plurality of object images are those captured within a predetermined time, for example, within the same day after the dust on the image-capturing plane of the image sensor 103 is physically removed by the physical dust removal processing. As a result, the dust removal controlling unit 104b can control the units to execute the dust removal processing by image processing based on the latest position of the dust even if the position of the dust on the image-capturing plane is changed by causing the image sensor 103 to be vibrated.

In case of (5) mentioned above, the dust removal controlling unit 104b controls the units not to execute a next physical dust removal processing until a predetermined time elapses from the execution of the previous physical dust removal processing or a predetermined number of frames of object image is taken. As a result, because a sufficient number of frames of the subject image to be used in specifying the position of the image of the dust is obtained, the accuracy in specifying the position of the image of the dust can be kept high.

The above described embodiments are examples, and various modifications can be made without departing from the scope of the invention.

What is claimed is:

1. A camera comprising:
an image obtaining unit that obtains an object image obtained by capturing an image of an object and a dust reference image obtained by capturing an image of dust that adheres to an image sensor or a protecting member protecting the image sensor;
a recording unit that records the object image and data concerning the dust reference image in correlation to each other;
a dust removing unit that physically removes the dust adhering to the image sensor or the protecting member, wherein
the recording unit is configured such that when the dust is removed by the dust removing unit, the recording unit stops correlating the object image captured after the removal to the data concerning the dust reference image already captured; and
the recording unit, during a period from the stoppage of the correlation to a restart of the correlation, records time-related data related to a time point at which the dust removing unit physically removed the dust in place of the data concerning the dust reference image in correlation to the object image.

2. A camera according to claim 1, further comprising:
an informing unit that, when the correlation of the object image to the data concerning the dust reference image is stopped, informs a user of the stoppage of the correlation.

3. A camera according to claim 1, further comprising:
a photographing condition setting unit that sets a photographing condition under which photographing is performed by the image capturing unit at a condition under which the dust reference image is to be obtained (dust reference image obtaining condition), wherein
the photographing condition setting unit automatically sets the dust reference image obtaining condition when the dust is physically removed by the dust removing unit, and
the image obtaining unit automatically obtains a new dust reference image under the set dust reference image obtaining condition.

4. A camera according to claim 1, further comprising:
a reminding unit that reminds a user of obtaining a new dust reference image when the dust is physically removed by the dust removing unit.

5. A camera according to claim 3, wherein
the recording unit, when the new dust reference image is obtained, restarts the correlation between data concerning the new dust reference image and the object image obtained thereafter.

6. A camera according to claim 1, wherein
the recording unit, when a new dust reference image is obtained by the image obtaining unit, records the time-related data in correlation to the new dust reference image.

7. A camera according to claim 1, wherein
the recording unit, when the new dust reference image is obtained by the image obtaining unit, correlates data concerning the new dust reference image to the object image that has been obtained during the period from the stop of the correlation to the restart of the correlation (target object image).

8. A camera according to claim 7, wherein
the recording unit records the data concerning the new dust reference image in correlation to the target object image only when the time-related data correlated to the target object image is the same as the time-related data correlated to the new dust reference image.

9. A camera according to claim 8, wherein
the recording unit records data that indicates absence of the data concerning the new dust reference image in correlation to the target object image when the time-related data correlated to the target object image is different from the time-related data correlated to the new dust reference image.

10. A camera according to claim 1, wherein
the dust removing unit physically removes the dust adhering to the image sensor or the protecting member by vibrating the image sensor or the protecting member.

11. A camera according to claim 1, further comprising:
an image processing unit that executes image processing using the data concerning the dust reference image recorded in correlation to the object image to remove the image of the dust from the object image.

* * * * *